(12) United States Patent
Wang et al.

(10) Patent No.: US 7,617,346 B2
(45) Date of Patent: Nov. 10, 2009

(54) RAPID INPUT/OUTPUT DOORBELL COALESCING TO MINIMIZE CPU UTILIZATION AND REDUCE SYSTEM INTERRUPT LATENCY

(75) Inventors: Chi-Lie Wang, Milpitas, CA (US); Kwong Hou Mak, Millbrae, CA (US); Jason Z. Mo, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 135 days.

(21) Appl. No.: 11/679,823

(22) Filed: Feb. 27, 2007

(65) Prior Publication Data

US 2008/0209139 A1      Aug. 28, 2008

(51) Int. Cl.
  *G06F 13/26*      (2006.01)
(52) U.S. Cl. ..................................................... 710/264
(58) Field of Classification Search .......... 710/260–269
  See application file for complete search history.

(56) References Cited

U.S. PATENT DOCUMENTS

| | | | | |
|---|---|---|---|---|
| 4,090,238 A * | 5/1978 | Russo | | 710/28 |
| 4,438,489 A * | 3/1984 | Heinrich et al. | | 710/264 |
| 4,768,149 A * | 8/1988 | Konopik et al. | | 710/47 |
| 5,202,964 A * | 4/1993 | Crouch | | 710/19 |
| 5,530,902 A | 6/1996 | McRoberts et al. | | |
| 5,578,953 A * | 11/1996 | Nuckols | | 327/215 |
| 5,608,873 A * | 3/1997 | Feemster et al. | | 709/214 |
| 5,905,913 A * | 5/1999 | Garrett et al. | | 710/49 |
| 5,991,817 A | 11/1999 | Rowett et al. | | |
| 6,070,219 A * | 5/2000 | McAlpine et al. | | 710/263 |
| 6,145,007 A * | 11/2000 | Dokic et al. | | 709/230 |
| 6,189,049 B1 * | 2/2001 | Klein | | 710/1 |
| 6,222,846 B1 * | 4/2001 | Bonola et al. | | 370/402 |
| 6,393,507 B2 * | 5/2002 | Klein | | 710/313 |
| 6,546,482 B1 * | 4/2003 | Magro et al. | | 713/1 |
| 6,954,811 B2 | 10/2005 | Vishnu | | |
| 7,154,902 B1 | 12/2006 | Sikdar | | |
| 7,353,360 B1 | 4/2008 | Muller et al. | | |
| 7,395,362 B2 * | 7/2008 | Drexler et al. | | 710/260 |
| 7,433,985 B2 * | 10/2008 | Ayyar et al. | | 710/260 |
| 2003/0061431 A1 | 3/2003 | Mears et al. | | |
| 2004/0123175 A1 | 6/2004 | Roth et al. | | |
| 2005/0015529 A1 | 1/2005 | Jung et al. | | |
| 2005/0138246 A1 | 6/2005 | Chen et al. | | |
| 2005/0273540 A1 * | 12/2005 | Whaley | | 710/260 |
| 2006/0168384 A1 * | 7/2006 | Radhakrishnan et al. | | 710/260 |
| 2007/0162642 A1 | 7/2007 | Tousek | | |

FOREIGN PATENT DOCUMENTS

DE      10155486 A1 *    5/2003

* cited by examiner

*Primary Examiner*—Paul R Myers
(74) *Attorney, Agent, or Firm*—Bever Hoffmann & Harms

(57) ABSTRACT

Status/error reporting is implemented using a doorbell system. A plurality of flag registers are included on a system device, such as a serial buffer. Each flag register has a corresponding address, and stores a plurality of flags. A flag scan controller accesses the flag registers in a predetermined priority order, using the flag register addresses. Upon detecting that one or more of the flags of a flag register are activated, the flag scan controller causes a doorbell command to be generated. The doorbell command includes the flag register address and the corresponding flags. A system processor receives the doorbell command and services the activated flags. Once the activated flags are serviced, the system processor performs one or more software write operations to clear the flags within the system device. The system processor can simultaneously service multiple flags. The system processor can also simultaneously clear multiple flags.

30 Claims, 2 Drawing Sheets

RAPID INPUT/OUTPUT DOORBELL COALESCING TO MINIMIZE CPU UTILIZATION AND REDUCE SYSTEM INTERRUPT LATENCY

RELATED APPLICATIONS

The present application is related to the following commonly-owned, co-filed U.S. Patent applications, which are hereby incorporated by reference in their entirety:

U.S. patent application Ser. No. 11/679,813 "PACKET-BASED PARALLEL INTERFACE PROTOCOL FOR A SERIAL BUFFER HAVING A PARALLEL PROCESSOR PORT", by Jason Z. Mo and Stanley Hronik.

U.S. patent application Ser. No. 11/679,817 "METHOD AND STRUCTURE TO SUPPORT SYSTEM RESOURCE ACCESS OF A SERIAL DEVICE IMPLEMENTING A LITE-WEIGHT PROTOCOL", by Chi-Lie Wang, Jason Z. Mo and Calvin Nguyen.

U.S. patent application Ser. No. 11/679,820 "HARDWARE-BASED CONCURRENT DIRECT MEMORY ACCESS (DMA) ENGINES ON SERIAL RAPID INPUT/OUTPUT SRIO INTERFACE", by Chi-Lie Wang and Bertan Tezcan.

U.S. patent application Ser. No. 11/679,824 "MULTI-BUS STRUCTURE FOR OPTIMIZING SYSTEM PERFORMANCE OF A SERIAL BUFFER", by Steve Juan, Chi-Lie Wang and Ming-Shiung Chen.

BACKGROUND OF THE INVENTION

1. Field of the Invention

The present invention relates to system status and error reporting. More specifically, the present invention relates to an improved method for implementing system status and error reporting in a device such as a serial buffer.

2. Related Art

System status and error reporting is typically performed by transmitting interrupts or messages from system devices to a system processor.

In interrupt-based schemes, an interrupt signal is transmitted from a system device to the system processor. Upon receiving this interrupt signal, the system processor software must poll the system devices one by one to determine which system device generated the interrupt to request service. As a result, the interrupt-based system will utilize significant processing power for polling, thereby increasing system processor utilization and degrading system performance.

In message-based schemes (or interrupt-based schemes that include an interrupt vector), the system processor may not need to poll the system devices to identify the system device that generated the message. However, the system processor software must poll the system device that generated the message to determine the system status or error being reported by this system device. In addition, each message generated by the system device is only able to inform the system processor of a single status or error. Thus, the system processor may not be informed of multiple status/errors at the same time. As a result, the message-based system will utilize significant processor power for context switch and interrupt handling, thereby increasing system processor utilization and degrading system performance.

The high latency and processor utilization exhibited by interrupt and message based schemes is especially detrimental in real time systems having embedded applications. It would therefore be desirable to have an improved status and error reporting scheme to minimize system processor utilization and reduce system interrupt latency.

SUMMARY

Accordingly, the present invention provides a doorbell system, which is used to report status and errors from a system device to a system processor. For example, the doorbell command may be used to report status and errors from a serial buffer to a serial rapid input/output (sRIO) host processor. The doorbell command includes a flag register identifier and corresponding plurality of flags, thereby identifying the status/errors that require attention.

In one embodiment, the system device includes a plurality of flag registers, each having a corresponding flag register address and storing a corresponding plurality of flags. A flag scan controller accesses the flag registers using the flag register addresses. In one embodiment, the flag registers are accessed based on pre-assigned priority. Upon detecting that one or more of the flags of a flag register are activated, the flag scan controller asserts a doorbell request to a doorbell generator. In response, the doorbell generator generates a doorbell command. The doorbell command includes the flag register address, which allows the system processor to identify the flag register. The doorbell command also includes the flags of the flag register.

The system processor receives the doorbell command and services the activated flags. Advantageously, the system processor is capable of simultaneously receiving multiple activated flags. Moreover, the system processor may simultaneously process multiple activated flags. After the system processor has serviced an activated flag, the system processor initiates a software write operation to clear the serviced flag. This software write operation results in overwriting the activated flag value with a deactivated flag value in the corresponding flag register of the system device. Clearing the flag in this manner advantageously eliminates race conditions. In accordance with another embodiment, the system processor may clear multiple serviced flags with a single software write operation.

The present invention will be more fully understood in view of the following description and drawings.

DETAILED DESCRIPTION

Figure 1:
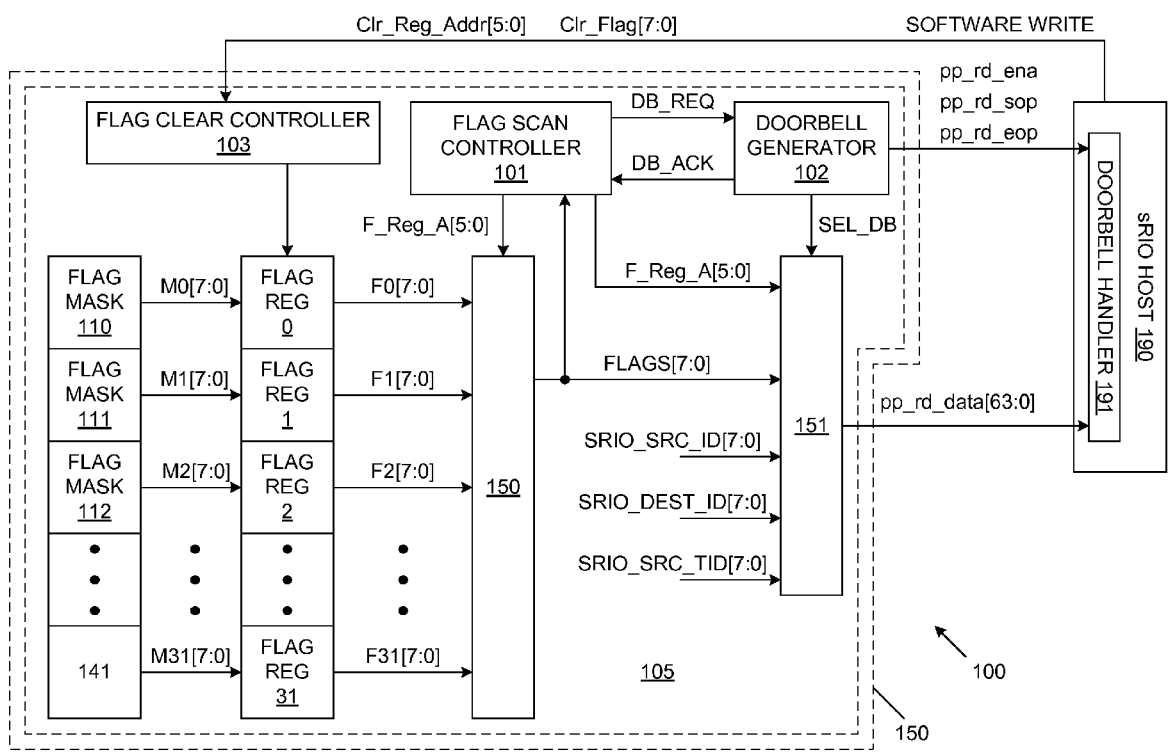
FIG. 1 a block diagram of a doorbell system, which is used to log status or report errors from a system device to a system processor in accordance with one embodiment of the present invention.

FIG. 1 a block diagram of a doorbell system 100, which is used to log status or report errors from a system device 150 to a system processor 190 in accordance with one embodiment of the present invention. In the described examples, system device 150 is a serial buffer and system processor 190 is a sRIO host processor, although this is not necessary. System device 150 is coupled to system processor 190 by a system bus, which also couples system processor 190 to other system devices (not shown).

In accordance with one embodiment of the present invention, a Lite-weight protocol is used to transmit information on the system bus. This Lite-weight protocol is described in more detail in commonly owned, co-filed U.S. patent application Ser. No. 11/679,817, which is hereby incorporated by reference in its entirety. The Lite-weight protocol uses a start of packet/end of packet identifier (SOP/EOP) to identify the start and end of each packet. As described in more detail below, the doorbell commands of the present invention are encoded in priority packets of the Lite weight protocol.

A priority packet of the Lite-weight protocol also includes a 64-bit payload field. As described in more detail below, when a priority packet is used to transmit a doorbell command, the 64-bit payload field identifies the source of the status/error reporting (e.g., a flag register address), as well as the associated status/error information (e.g., a flag or set of flags).

System device 150 includes a doorbell control circuit 105, which includes the flag registers 0-31, flag scan controller 101, doorbell generator 102, flag clear controller 103, flag mask registers 110-141 and multiplexers 150-151.

Each of the flag registers 0-31 is used to store a set of flags, wherein each of these flags is used to log status or report errors. In the described examples, each of the flag registers 0-31 stores 8-bits of flag information. The flag information may log the status and/or errors associated with system device 150, including but not limited to, queue empty/full conditions, queue almost empty/almost full conditions, link status errors, missing packet errors, memory configuration errors, I2C errors and/or JTAG errors. In the described examples, flag bits stored in flag registers 0-31 are considered to be 'activated' or 'asserted' when these flag bits have a logic '1' state.

Each of flag registers 0-31 has a corresponding assigned address. In the described embodiment, each of the flag registers 0-31 is identified by a corresponding unique 6-bit flag register address signal F_Reg_A[5:0]. For example, flag register 0 may have an address of "000000", flag register 1 may have an address of "000001", and flag register 31 may have an address of "011111").

In the described examples, each of flag registers 0-31 has a corresponding flag mask register 110-141, respectively. Each of the flag mask registers 110-141 stores 8 mask bits, which selectively enable or disable the 8 flag bits of the corresponding flag registers 0-31. Thus, flag mask register 110 provides mask bits M0[7:0], which effectively enable or disable the corresponding flag bits stored in flag register 0. In one example, the flag mask bits are logically AND'ed with the flag bits stored in the corresponding flag registers. For example, if flag mask register 110 stores flag mask bits M0[7:0] having a value of '0111 1111', then the flags stored in the seven least significant bits of flag register 0 are enabled, while the flag stored in the most significant bit location of flag register 0 is disabled. As will become apparent in view of the subsequent disclosure, only enabled flag register bits can result in the generation of a doorbell command. Flag registers 0, 1, 2, ... 31 provide the masked flag register bits as flag sets F0[7:0], F1[7:0], F2[7:0], ... F31[7:0], respectively, to multiplexer 150.

Flag scan controller 101 scans the flag sets provided by each of the flag registers 0-31, and services the highest priority flag register having an activated and enabled flag. In the described embodiment, priority is assigned based on the flag register address. More specifically, flag registers 0-31 are assigned a decreasing priority from flag register 0 (highest priority) to flag register 31 (lowest priority). Flag scan controller 101 provides a flag register address signal F_Reg_A[5:0] to control the output flag set routed by multiplexer 150. Multiplexer 150 routes the flag set of the flag register identified by the flag register address F_Reg_A[5:0]. Flag scan controller 101 sequences the flag register addresses in order of highest priority to lowest priority. Thus, in the present example, flag scan controller 101 initially provides a flag register address F_Reg_A[5:0] of '00000', thereby causing multiplexer 150 to initially route the flag set F0[7:0] from flag register 0 as the output flag set FLAGS[7:0]. Flag scan controller 101 subsequently increments the flag register address F_Reg_A[5:0], thereby sequentially routing the flag sets of flag registers 1-31 as the output flag set FLAGS[7:0].

The output flag set FLAGS [7:0] is provided to flag scan controller 101 and multiplexer 151. If flag scan controller 101 determines that one or more bits of the output flag set FLAGS [7:0] are activated (e.g, by determining whether a logical OR of this flag set equals '1'), then flag scan controller 101 activates a doorbell request signal DB_REQ, which is provided to doorbell generator 102. In response, doorbell generator 102 generates a doorbell command, which is packaged in a priority packet format and transmitted to system processor 190.

More specifically, doorbell generator 102 generates the doorbell command as follows. Doorbell generator 102 activates a doorbell select signal, SEL_DB, which is provided to multiplexer 151. In response, multiplexer 151 routes the output flag set FLAGS[7:0] and the corresponding flag register address F_Reg_A[5:0] as a portion of the 64-bit data payload of a priority packet pp_rd_data[63:0]. In one embodiment, the flag register address F_Reg_A[5:0] is routed as pp_rd_data[51:46], and the output flag set FLAGS[7:0] is routed as pp_rd_data[45:37], in accordance with the teachings of U.S. patent application Ser. No. 11/679,817.

In addition, multiplexer 151 may route a source ID value sRIO_SRC_ID[7:0] (which identifies source device 150), a destination ID value sRIO_DEST_ID[7:0] (which identifies system processor 190), and a source transaction ID value sRIO_SRC_TID[7:0] (which is incremented by one for each doorbell command, and identifies each unique status/error reporting transaction) as part of the doorbell command. The source ID value sRIO_SRC_ID[7:0] and destination ID value sRIO_DEST_ID[7:0] are pre-programmed within system device 150. Because the Lite-weight protocol implemented by the present examples uses point-to-point connections, the source ID value, destination ID value and source transaction ID value are not needed in these examples. However, if a sRIO protocol is implemented (i.e., in another embodiment), the source ID value, destination ID value and the source transaction ID value are pre-pended to the sRIO packet header, and transmitted to the host processor 190.

In response to the activated a doorbell request signal DB_REQ, door bell generator 102 also activates a priority packet read start-of-packet signal (pp_rd_sop) and a priority packet read enable signal (pp_rd_ena), which are included in the control field of the priority packet transmitted to system processor 190. In addition, doorbell generator 102 activates a doorbell acknowledge signal DB_ACK, thereby notifying flag scan controller 101 that the output flag set FLAGS[7:0] has been forwarded to system processor 190 via a doorbell command. Doorbell generator 102 subsequently activates a priority packet read end-of-packet signal (pp_rd_eop), which is provided to system processor 190 to complete the doorbell transaction within doorbell generator 102.

System processor 190 includes a doorbell handler 191, which receives the doorbell command priority packet from system device 150. Upon receiving the doorbell command priority packet, doorbell handler 191 identifies the flag register and the associated flags of system device 150 that need to be serviced. Note that system processor 190 does not need to poll any system devices to obtain this information. Also note that system processor 190 can service up to eight flags at once without leaving the interrupt service routine, thereby advantageously minimizing context switch time.

Doorbell handler 191 invokes software within system processor 190 to service the activated and enabled (pending) flags identified by the doorbell command priority packet. After a pending flag is serviced by system processor 190, system processor 190 clears the corresponding real-time flag within the flag register of system device 150. The pending flags remain latched within system processor 190 until the system processor 190 clears the corresponding real-time flags in system device 150.

In accordance with one embodiment of the present invention, system processor 190 clears the flags stored in flag registers 0-31 of system device 150 using a software write operation. The software write operation is performed as follows in accordance with one embodiment of the present invention. System processor 190 provides a flag register address signal Clr_Reg_Addr[5:0] and a flag identifier signal Clr_Flag[7:0] to flag clear controller 103. The flag register address Clr_Reg_Addr[5:0] corresponds with the address of the flag register containing the flag(s) to be cleared. The flag identifier signal Clr_Flag[7:0] identifies the bit location(s) of the flag(s) to be cleared within the flag register identified by the Clr_Reg_Addr[5:0] signal. In one embodiment, the flag identifier signal Clr_Flag[7:0] has a logic '1' value for each flag to be cleared. For example, after system processor 190 services the flag at bit location [4] of flag register 2, system processor 190 will transmit a flag register address signal Clr_Reg_Addr[5:0] having a value of [000010] (which identifies flag register 2), and a flag identifier signal Clr_Flag[7:0] having a value of [00010000] (which identifies bit location [4] of flag register 2). Similarly, if system processor 190 simultaneously services the flags at bit locations [7] and [0] of flag register 5, system processor 190 will transmit a flag register address signal Clr_Reg_Addr[5:0] having a value of [000101] (which identifies flag register 5), and a flag identifier signal Clr_Flag[7:0] having a value of [10000001] (which identifies bit locations [7] and [0] of flag register 5).

Upon receiving a Clr_Flag[7:0] signal having one or more logic '1' values, flag clear controller 103 performs a special write operation to the flag register identified by the Clr_Reg_Addr[5:0] signal. More specifically, flag clear controller 103 writes a logic '0' value to each of the bit locations (flags) identified by logic '1' values in the Clr_Flag[7:0] signal. Writing logic '0' values in the manner effectively clears the flags that have been serviced by system controller 190. The bit locations (flags) not identified by logic '1' values in the Clr_Flag[7:0] signal remain unchanged by the write operation. The above-described write operation may be performed, for example, using a conventional read-modify-write operation, or by masking the write operation.

As a result of the above-described process, doorbell handler 191 will not log any subsequent real-time changes to a pending flag, until after the pending flag has been serviced by system processor 190. If a flag bit has been set to a logic "1" state, and a doorbell command has been generated, a subsequent doorbell command will not be generated for the same flag bit in the same flag register until this flag bit has been cleared (i.e., hardware logic will be disabled within flag scan controller 101). As a result, no spurious interrupt/doorbell commands will be sent to doorbell handler 191. In addition, the software within system processor 190 can determine how many flags remain to be serviced within any given flag register, because system processor 190 only clears flags that have been serviced. In this manner, race conditions are prevented, thereby achieving maximum efficiency for flag handling.

Figure 2:
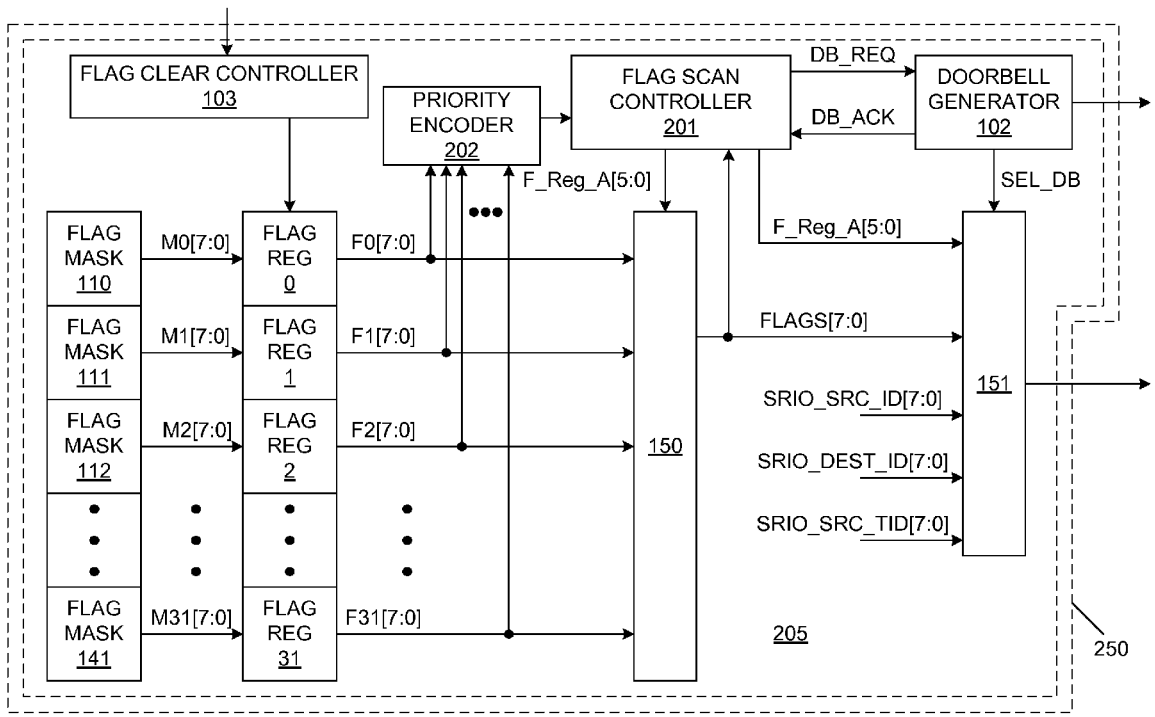
FIG. 2 is a block diagram of a doorbell control circuit in accordance with an alternate embodiment of the present invention.

FIG. 2 a block diagram of a system device 250 having a doorbell control circuit 205 in accordance with an alternate embodiment of the present invention. Because doorbell control circuit 205 is similar to doorbell control circuit 105, similar elements in doorbell control circuits 205 and 105 are labeled with similar reference numbers. Thus, doorbell control circuit 205 includes flag registers 0-31, doorbell generator 102, flag clear controller 103, flag mask registers 110-141 and multiplexers 150-151, which are described above in connection with FIG. 1. In addition, doorbell control circuit 205 replaces flag scan controller 101 with flag scan controller 201, and adds priority encoder 202.

Priority encoder 202 is coupled to receive each of the flag sets F0[7:0], F1[7:0], F2[7:0], ... F31[7:0] from flag registers 0-31. Priority encoder 202 monitors these received flag sets F0-F31 in parallel to determine which (if any) of the corresponding flag registers 0-31 store one or more asserted and unmasked flag bits. Priority encoder 202 also determines which of the flag registers having one or more asserted and unmasked flag bits has the highest priority. Priority encoder 202 provides a priority signal, which identifies the flag register storing one or more asserted and unmasked flag bits and having the highest priority. Priority encoder 202 provides the priority signal to flag scan controller 201. In response, flag scan controller 201 provides the flag register address F_Reg_A[5:0] corresponding with the flag register identified by the priority signal to multiplexer 150. Multiplexer 150 routes the flag set associated with the flag register address provided by flag scan controller 201.

Priority encoder 202 then provides a priority signal, which identifies the flag register storing one or more asserted and unmasked flag bits, and having the next highest priority. Flag scan controller 201 processes this priority signal in the same manner described above.

If none of the flag registers has one or more asserted and unmasked flag bits, then priority encoder 202 generates a priority signal that indicates this state, and flag scan controller 201 does not route any of the flag sets through multiplexer 150. Thus, in the present embodiment, flag scan controller 201 only routes flag sets having one or more asserted and unmasked flag bits. That is, flag scan controller 201 only routes flag sets that require servicing.

In one embodiment, priority encoder 202 stores each flag set that causes a corresponding priority signal to be generated, and then prevents previously asserted and unmasked flag bits from this flag set from causing additional priority signals to be generated until after these previously asserted and unmasked flag bits have been cleared.

Although the present invention has been described in connection with several embodiments, it is understood that this invention is not limited to the embodiments disclosed, but is capable of various modifications which would be apparent to one of ordinary skill in the art. Thus, the invention is limited only by the following claims.

We claim:

1. A doorbell system comprising a system device that includes:
   a plurality of flag registers, each having a corresponding flag register address, and each having a plurality of flag entries for storing status/error information associated with the system device;
   a flag scan controller configured to monitor the flag registers, and activate a doorbell request upon detecting that one or more of the flag entries of a flag register is asserted; and a doorbell generator configured to receive the activated doorbell request, and in response, route the flag entries and the flag register address of the flag register as a doorbell command.

2. The doorbell system of claim 1, further comprising a system processor configured to receive the doorbell command, and in response, process the one or more asserted flag entries of the flag register.

3. The doorbell system of claim 2, wherein the system processor is configured to identify a portion of the system device that requires service in response to the flag entries and the flag register address present in the doorbell command.

4. The doorbell system of claim 2, wherein the system device further includes a flag clear controller configured to clear one or more of the asserted flag entries of the flag register in response to a clear operation initiated by the system processor.

5. The doorbell system of claim 4, wherein the flag clear controller is configured to clear the one or more of the asserted flag entries of the flag register which have been serviced by the system processor, without affecting other asserted flag entries of the flag register that have not been serviced by the system processor.

6. The doorbell system of claim 1, wherein the system device further comprises a plurality of flag mask registers, each coupled to a corresponding one of the flag registers, and each having a plurality of mask entries for masking the status/error information stored by the flag registers.

7. The doorbell system of claim 1, wherein the status/error information comprises flags to indicate the fill level of memory devices of the system. device.

8. The doorbell system of claim 1, wherein the status/error information comprises flags to indicate error conditions of the system device.

9. The doorbell system of claim 1, wherein the system device further stores identifier values that identify the system device and a system processor, wherein the doorbell generator is configured to route the identifier values as part of the doorbell command.

10. The doorbell system of claim 9, wherein the system device further stores a source transaction identifier value that identifies each unique doorbell command.

11. The doorbell system of claim 1, wherein the doorbell generator is configured to attach a start of packet (SOP) identifier to the doorbell command, and route the doorbell command in a packet format.

12. The doorbell system of claim 11, wherein the doorbell generator is further configured to attach an end of packet (EOP) identifier to a doorbell command which is routed in a packet format.

13. The doorbell system of claim 1, wherein the flag scan controller is configured to sequentially monitor the flag registers in a predetermined order.

14. The doorbell system of claim 13, wherein the flag scan controller is configured to sequentially access the flag registers using the flag register addresses.

15. The doorbell system of claim 1, wherein the flag scan controller is configured to monitor the flag registers in parallel to identify any flag registers that store one or more asserted flag entries, and wherein the flag scan controller is further configured to select a flag register having a highest priority from the flag registers that store one or more asserted flag entries.

16. A method of implementing status/error reporting comprising:
storing status/error information associated with a system device in a plurality of flag registers, each having a plurality of flag entries and an associated flag register address;
monitoring each of the flag registers to determine if one or more of the flag entries of a flag register is asserted;
asserting a doorbell command if one or more flag entries of a flag register is activated, wherein the doorbell command includes the flag entries and flag register address of the flag register.

17. The method of claim 16, further comprising:
transmitting the doorbell command to a system processor; and
servicing the one or more activated flag entries specified by the doorbell command with the system processor.

18. The method of claim 17, further comprising clearing each of the flag entries with the system processor, wherein the system processor only clears a flag entry after servicing the flag entry.

19. The method of claim 18, wherein the system processor clears a flag entry by initiating a write operation to the corresponding flag register.

20. The method of claim 19, wherein the write operation only modifies the flag entry being cleared.

21. The method of claim 17, wherein the system processor simultaneously services a plurality of activated flag entries.

22. The method of claim 21, further comprising simultaneously clearing a plurality of flag entries by initiating a single write operation to the corresponding flag register, wherein single write operation is initiated by the system processor after servicing the plurality of flag entries.

23. The method of claim 16, further comprising masking one or more of the flag entries, thereby preventing these flag entries from causing the doorbell command to be asserted.

24. The method of claim 16, wherein the status/error information comprises flags to indicate the fill level of one or more memory devices.

25. The method of claim 17, further comprising including identifier values in the doorbell command, wherein the identifier values identify the system processor and a system device that includes the flag registers.

26. The method of claim 16, further comprising including a start of packet (SOP) identifier in the doorbell command.

27. The method of claim 26, further comprising including an end of packet (EOP) identifier in a doorbell command.

28. The method of claim 16, further comprising sequentially monitoring the flag registers in an order of assigned priority.

29. The method of claim 28, further comprising sequentially monitoring the flag registers in response to the flag register addresses.

30. The method of claim 16, further comprising:
monitoring the flag registers in parallel to identify any flag register that stores one or more asserted flag entries; and
generating a doorbell command in response to a flag register that stores one or more asserted flag entries and has a highest assigned priority.

* * * * *